United States Patent [19]

Borg

[11] Patent Number: 5,355,514

[45] Date of Patent: Oct. 11, 1994

[54] METHOD FOR DETERMINING THE TRANSMISSION QUALITY OF A HOME TRAFFIC CONNECTION IN A MOBILE RADIO SYSTEM

[75] Inventor: Lars U. Borg, Stockholm, Sweden

[73] Assignee: Telefonaktiebolaget L M Ericsson, Stockholm, Sweden

[21] Appl. No.: 691,221

[22] Filed: Apr. 25, 1991

[30] Foreign Application Priority Data

May 23, 1990 [SE] Sweden ............................ 9001869-8

[51] Int. Cl.$^5$ ............................................ H04B 1/10
[52] U.S. Cl. .................................. 455/33.1; 455/56.1; 455/63; 455/67.3; 370/95.3
[58] Field of Search ................. 455/33.1, 53.1, 54.1, 455/56.1, 62–63, 67.3, 67.4, 68, 226.2, 226.3; 370/95.3

[56] References Cited

U.S. PATENT DOCUMENTS

| | | | |
|---|---|---|---|
| 3,543,161 | 11/1970 | Hatton et al. | 455/67.4 |
| 4,119,964 | 10/1978 | Johannsen et al. | 455/67.3 |
| 4,723,303 | 2/1988 | Koch | 455/303 |
| 4,837,858 | 6/1989 | Ablay et al. | 455/34.1 |
| 4,850,033 | 7/1989 | Eizenhöfer et al. | 455/56.1 |
| 4,980,924 | 12/1990 | Reed et al. | 455/63 |
| 5,050,234 | 9/1991 | Ohteru | 455/67.3 |
| 5,179,722 | 1/1993 | Gunmar et al. | 455/67.3 |

FOREIGN PATENT DOCUMENTS 0344539 12/1989 European Pat. Off. .
2612476 9/1977 Fed. Rep. of Germany .

Primary Examiner—Edward F. Urban
Assistant Examiner—Andrew Faile
Attorney, Agent, or Firm—Burns, Doane, Swecker & Mathis

[57] ABSTRACT

A base station (BS1) in a mobile radio system has connection in a first cell (1) with a mobile station (MS1) on a two-way channel (K1) having two carrier frequencies. A base station (BS2) and a mobile station (MS2) in a second cell (2) remote from the first cell are mutually connected on the channel (K1) disturbing the connection in the first cell (1) through signals (F1, R1). The combined signal strength of the disturbing (F1, R1) and the home connection (K1) is measured. The signal strength of solely the disturbing connection (F1, R1) is also measured, the carrier frequency of home connection being closed down. The quotient between these signal strengths is a measure of connection quality. The stations (MS1,BS1) may include means for closing down their respective carrier frequencies when no information is transmitted, the receiving station then measuring the disturbing signal strength. In time-shared systems, the disturbing signal can be measured during time slots which belong to connections other than the home connection.

9 Claims, 3 Drawing Sheets

METHOD FOR DETERMINING THE TRANSMISSION QUALITY OF A HOME TRAFFIC CONNECTION IN A MOBILE RADIO SYSTEM

TECHNICAL FIELD

The present invention relates to a method for determining a transmission quality of a home traffic connection in a mobile radio system, wherein the mobile radio system includes two-way radio channels, each having two carrier frequencies at a desired frequency distance from one another;

the home traffic connection, which is established between a base station and a subscriber mobile station, utilizes an indicated one of the radio channels; and wherein the indicated radio channel can be used within the mobile radio system by further subscribers as traffic connections whose radio signals are liable to interfere with the radio signals of the home traffic connection.

BACKGROUND ART

In a cell-divided mobile radio system, the geographic regions of the system are divided into cells which are collected into larger groups, often referred to as clusters. Each cell is allocated a number of carrier frequencies in accordance with a frequency plan, so that mutually adjacent cells will not disturb one another and so that a carrier frequency pattern can be formed in the group. Each cell may have a base station, and it is also possible to serve several cells from a single base station. The pattern of carrier frequencies is then repeated with each group. A mobile radio system of this kind is described in more detail in CMS88, Cellular Mobile Telephone System, Ericsson Telecom, 1988, Chapter 6.

In an adaptive mobile radio system, each base station is able to transmit on all carrier frequencies and the channels are allocated to a mobile station subsequent to having established the extent to which the separate carrier frequencies are disturbed. As the channels are allocated, there forms a changing geographic pattern of carrier frequencies which are so allocated that no one connection will disturb the other. Channel allocation is normally effected with the aid of a control channel on a carrier frequency, and traffic signals are transmitted on traffic channels of other carrier frequencies. When the number of carrier frequencies is limited, it is extremely difficult to avoid disturbances between separate connections which use one and the same carrier frequency. Among other things, this difficulty is because the mobile stations are liable to have a disturbing effect of varying magnitude when they move. Various methods have been proposed for creating a measurement of the quality of a connection, for instance with the aid of SAT (Supervising Audio Tone) as described in the aforesaid reference CMS88, Chapter 1:10. The base station transmits on a desired carrier frequency a tone which has a modulation frequency above the audible range. The tone is received by the mobile station and retransmitted to the base station. The base station can determine the extent to which the selected carrier frequency is disturbed, by comparing the transmitted tone with the retransmitted tone. In the case of digital transmission systems, the Bit Error Rate, BER, can be used as a measurement of the disturbance. The drawback with both of these methods, however, is that they give an indirect measurement of how the carrier frequency from a disturbing connection influences the home connection.

In a thesis submitted at the Royal Institute of Technology (Kungl. Tekniska Högskolan) by Christer Gustavsson and entitled "Simulering av adaptive kanalval" (Simulation of Adaptive Channel Selection), Ericsson Radio Systems AB, 1987, there is described a method of reducing the number of calls which are blocked when changing base stations, for instance. The base stations have, in the main, permanently allocated channels, but they also have a smaller number of adaptive channels. The base station and the mobile station measure the signal strength on the call channels of the system and use these measurements as a measurement of the signal strength of traffic channels which can be connected. The mobile station and the base station also measure the signal strength of traffic channels between foreign mobile stations and base stations. These traffic channels constitute disturbances on the connection to be established. There is selected a traffic channel whose disturbance has a low signal strength in relation to the signal strength of the call channel. Although the method enables the transmission quality of a traffic connection to be adequately assessed and also provides for an adequate choice of traffic channel, it does not provide a direct measurement of the signal strength of the selected traffic channel, which is a disadvantage. Neither does the method provide the possibility of measuring continuously the transmission quality of the home traffic connection that has been established. A similar method of determining transmission quality has been proposed for the European mobile telephony system. This method is described in ETSI/GSM 05.08, Version 3.5.0, Chapter 3.

DISCLOSURE OF THE INVENTION

The inventive method avoids the aforesaid drawbacks associated with known techniques. The invention is based on the concept of measuring the signal strength of the carrier frequency of the home traffic connection and also the signal strength of the carrier frequency of disturbing traffic connections over a time interval in which the carrier frequency of the home connection is closed down.

The invention is characterized by the characterizing features set forth in the following claims.

BRIEF DESCRIPTION OF THE DRAWINGS

An exemplifying embodiment of the invention will now be described in more detail with reference to the accompanying drawings, in which.

BEST MODE OF CARRYING OUT THE INVENTION

Figure 1:
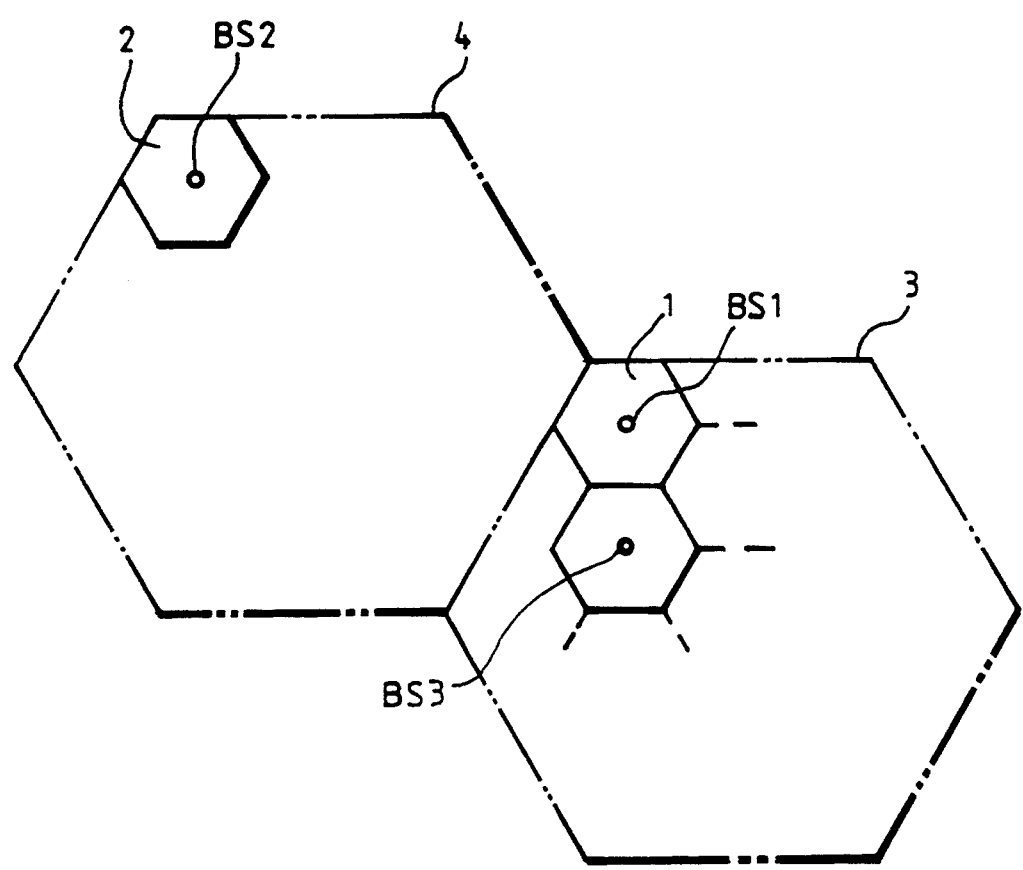
FIG. 1 illustrates cells and cell-groups of a mobile telephony system.
Figure 2:
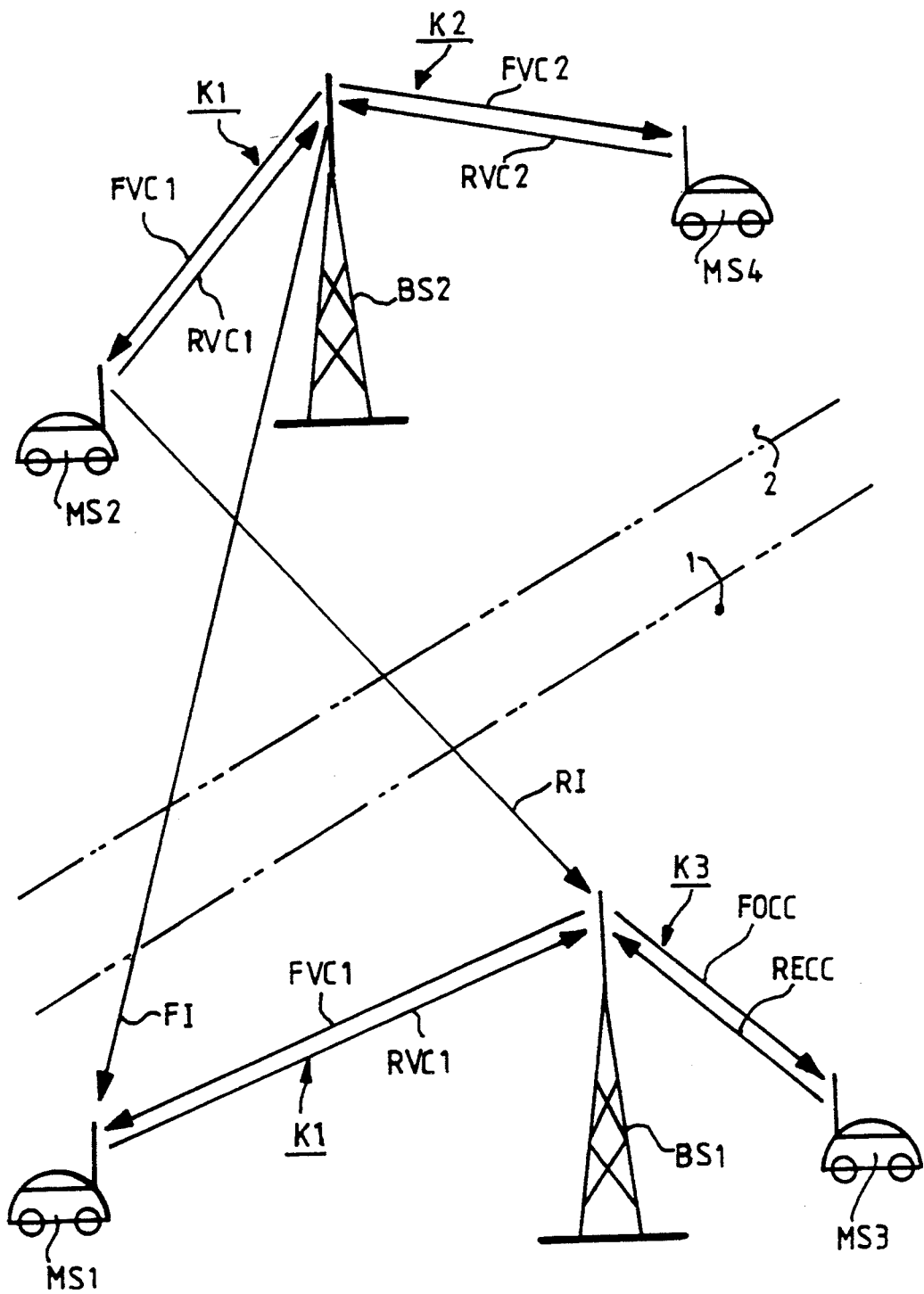
FIG. 2 illustrates schematically signal paths and disturbances between base stations and mobile stations.

FIG. 1 illustrates schematically the geographic dividing of a cellular mobile radio system. A cell 1 having a base station BS1 is included in a cell group 3. The mobile telephony system is allocated a frequency band which has been divided into a number of channels, for instance 400 separate channels. The mobile system has a fixed frequency plan and each cell in the group 3 has access to a smaller number of the channels, for instance 20 channels for each cell. The 400 channels are so distributed within the cell group 3 that any one channel having a given pair of carrier frequencies will only occur once. This counteracts interchannel disturbance. A cell 2 having a base station BS2 belongs to an adjacent cell group 4, which has access to the 400 channels in a corresponding manner. The base station BS2 has access to the same channels as the base station BS1 and these base stations are spaced as far apart as possible, so as to avoid disturbances to the greatest possible extent. A more detailed description of cell division and frequency plans is given in the aforesaid reference CMS88, Chapter 6. FIG. 2 illustrates the base station BS1 with mobile stations MS1 and MS3 within the cell 1, and the base station BS2 with mobiles MS2 and MS4 within the cell 2. The base station BS1 has a traffic connection with the mobile MS1 on a traffic channel K1, which includes an outgoing channel FVC1 from the base station and an incoming channel RVC1 to the base station. The mobile MS3 establishes a traffic connection to the base station BS1 with the aid of a control channel K3 with an outgoing control channel FOCC and an incoming control channel RECC. The base station BS2 has a traffic connection with the mobile MS2 on the channel K1 and with the mobile MS4 on a channel K2, which includes an outgoing channel FVC2 and an incoming channel RVC2. The channels lie in the 800 MHz-band and the frequency difference of the carrier frequency between outgoing and incoming channels is 45 MHz for all channels, both the traffic channels and the control channels. The frequency difference between two mutually adjacent channels is 30 kHz.

There is some risk that the channel K1 in the cell 1 will be disturbed by interferences from channel K1 in cell 2, despite the long distance between the base stations B1 and B2, as mentioned above with reference to FIG. 1. The object of the present invention is to provide a method for measuring and determining the transmission quality of the home traffic connection on channel K1 between the base station BS1 and the mobile station MS1. More specifically, the transmission quality is determined as the quotient of C/I, where the magnitude C is the signal strength of the carrier frequency of the channel K1 between the base station BS1 and the mobile MS1 and where the magnitude I is the combined interfering signal strength of carrier frequencies for the channel K1 when the connection between the base station BS1 and the mobile station MS1 is closed. In the illustrated case, this interfering signal strength originates from the connection between the base station BS2 and the mobile station MS2, although other connections (not shown) on the channel K1 can also contribute to the strength of the interfering signal.

FIG. 2 illustrates an interfering signal F1 passing from the base station BS2 to the mobile MS1, and an interfering signal R1 passing from the mobile MS2 to the base station BS1. The quality of the transmission is determined in the following manner, provided that F1 and R1 are the only interfering signals. The mobile MS1 measures the combined signal strength C+I of the outgoing channel FVC1 from the base stations BS1 and BS2. When the carrier frequency of the outgoing channel FVC1 from the home base station BS1 is closed, the mobile MS1 measures the strength I of the interfering signal FI. The quality of the transmission is then calculated as $(C+I)/I - 1 = C/I$. The base station BS1 measures the combined signal strength C+I of the incoming channel RVC1 from the mobile MS1 and MS2 in a corresponding manner. When the carrier frequency of the incoming signal RVC1 from the mobile MS1 is closed, the base station BS1 measures the strength I of the interfering signal RI. According to the present invention, only one of the base stations or one of the mobile stations measures the signal strengths and the result obtained for C/I is exchanged between the stations.

In the case of the aforedescribed method, a problem exists in measuring the signal strength I of the carrier frequency for the interfering signal, represented by the signals FI and RI respectively in the illustrated example. This measurement shall be taken when the carrier frequency on the home traffic connection is closed and, according to one embodiment, the problem is solved in the following manner. In order to save battery power, the transmitter, normally the mobile MS1, is equipped with a device for closing the carrier frequency. This is done during a time interval in which no modulated signal is delivered to the transmitter. The subscriber only listens, and no information is transmitted to the base station BS1 on the carrier frequency of the channel RVC1. The base station BS1 measures the strength I of the interfering signal RI during these silent intervals. The device used to close down the carrier frequency is well known to those skilled in this art and will not be described in detail. The receiver, i.e. the base station BS1, can ascertain that solely the interfering signal RI has been measured, by listening on the aforesaid SAT-signal. If the carrier frequency of the mobile is closed, the SAT-signal transmitted by the base station is not re-transmitted. This supervisory signal occurs in a solely frequency-shared mobile radio system, a FDMA-system. A corresponding supervisory signal, normally referred to as a DVCC-signal (Digital Verification Color Code) occurs in a time-shared radio system.

In a time shared system, the base station can listen to the DVCC-signal in a corresponding manner, so as to determine when the carrier frequency of the mobile MS1 is closed.

Figure 3:
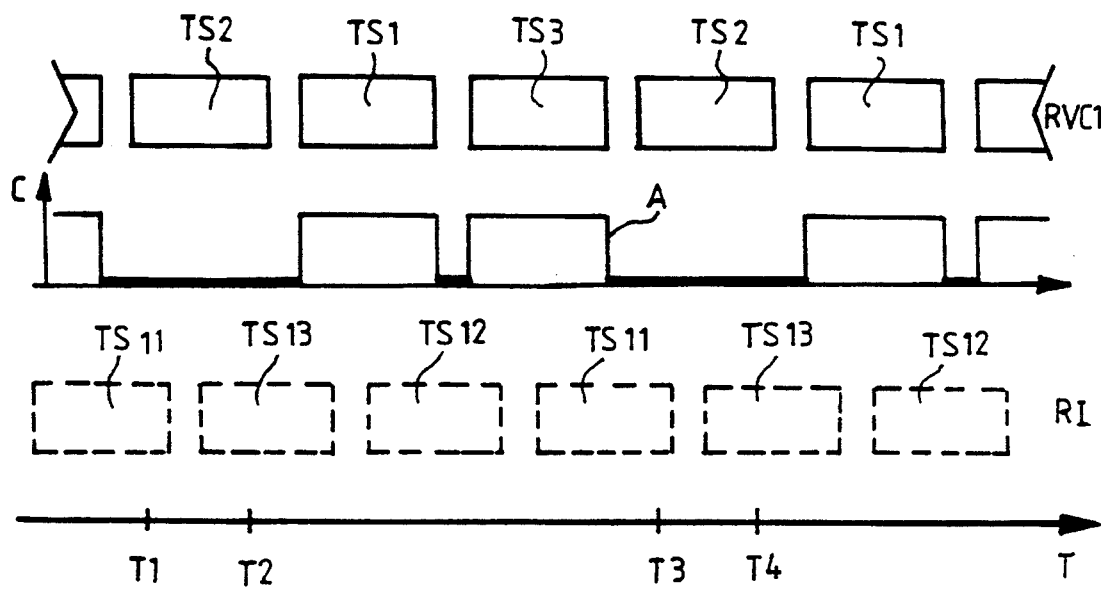
FIG. 3 illustrates time slots and signal strengths for a time-shared mobile telephony system.
Figure 4:
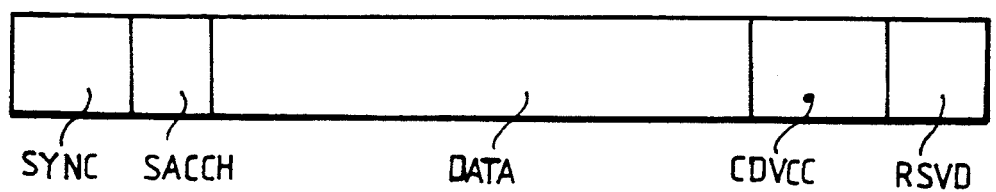
FIG. 4 illustrates a time slot signal sequence.

In a time-shared mobile telephony system, the strength I of the interfering signal can also be measured in the following manner. Each carrier frequency is divided into a number of time slots, for instance in accordance with the exemplifying time slots TS1, TS2 and TS3 shown in FIG. 3. Traffic is found on the time slots TS1 and TS3, as illustrated by a curve A in the Figure, where the magnitude C denotes the signal strength of the carrier frequency and T denotes time. Information concerning the ongoing traffic is stored in the base station BS1. The base station measures the strength of the interfering signal RI at time points T1, T2, T3 and T4 over the duration of the time slot TS2, which is silent. The interfering signal RI also includes the three time slots designated TS11, TS12 and TS13, which are not synchronized with the time slots TS1, TS2 and TS3. There is, however, some correlation, between the disturbance in the silent time slot TS2 and the disturbance in the trafficated time slots TS1 and TS3. By measuring at repeated time points, as illustrated in the Figure, there is obtained a measurement of the strength I of the interfering signal RI, which is also relevant to the trafficated time slots TS1 and TS3. A corresponding measuring procedure can be effected from the mobile MS1, which receives from the base station BS1 information as to which time slots are trafficated. This information is transmitted on the traffic channel, the time slot TS1, as illustrated in FIG. 4. The time slot TS1 from the base station BS1 includes a signal sequence which includes a synchronizing sequence SYNC, a control sequence SACCH (Slow Associated Control Channel), a data sequence DATA containing the speech transmitted, the aforesaid DVCC-signal, and a sequence RSVD (Researd) which can be used for any desired purpose. The control sequence SACCH can be utilized for transmitting the aforesaid information to the mobile MS1 relating to trafficated time slots. When measuring the interference I outside the home time slot, measurements are advantageously taken on several occasions, for instance at the time points T1, T2, T3 and T4 in FIG. 3, in order to enable the interference value to be well calculated. Such repeated measurements are particularly important when measuring from the base station BS1, since the disturbances originate from cells peripheral of mobile stations. The mobile stations are randomly distributed over the cell areas and are movable, and statistical processing of the interference measurements obtained is advantageously carried out.

The signal sequence from the base station BS1 illustrated in FIG. 4 provides the mobile MS1 with a further possibility of measuring the interference I. The base station BS1 can interrupt the transmission of its carrier frequency in one of the time slots TS1 during the sequence RSVD, and the mobile MS1 can measure the interference I during this sequence. The base station BS1 sends to the mobile in the preceding time slot TS1, during the sequence RSVD, a message to the effect that the carrier frequency from the home base station has actually been closed, so that the mobile will be prepared to measure the interference. It is also possible for the mobile to measure the signal strength continuously during the signal sequence RSVD and subsequently receive from the base station a message to the effect that the carrier frequency in RSVD was actually closed down throughout the duration of the preceding time slot.

A further example of how the interference I can be measured is described below. It is possible for the mobile or the base station to interrupt the carrier frequency during the whole of a time slot, even though information should normally have been transmitted in this time slot. The strength I of the interfering signal is measured by the receiving station during this time slot. In this case, a message is exchanged between the base station and the mobile station, so that the receiving station will be informed of the fact that the carrier frequency of the transmitting station is closed down. This message can be transmitted on the signal SACCH in FIG. 4. In the future European mobile telephony system GSM, there is space in the signal sequence for the mobile to order the base station to close its carrier frequency. The drawback with this method is that information which should have been exchanged between the stations in the closed time slot is lost and the bit-error content increases.

The aforedescribed method enables the signal quality of the home traffic connection to be determined by measuring and calculating the quotient C/I. This value constitutes a valuable measurement since, for instance, it enables a decision to be made as to whether the mobile needs to hand-over, i.e. pass from one channel to another. The method has the advantage of being based on direct measurement of partly the signal strength C of the home carrier frequency and partly the signal I of the interfering signal. It should be noted that the C/I-value used in accordance with the invention does not replace other measurements of transmission quality, for instance bit-error content, but complements these measurements. This circumstances are demonstrated by the following example.

The total disturbance on the channel FVC1 to the mobile MS1 shown in FIG. 2 is, among other things, composed of the aforesaid interference I, noise and multipath propagation. Multipath propagation results from the fact that the base station BS1 is able to reach the mobile MS1 partly through direct signals, as indicated in FIG. 2, and partly through signals reflected from buildings, surrounding hills and the like. The reflected signals are delayed in relation to the direct signals and the multipath propagation contributes in increasing the bit-error content. When the signal strength C is sufficiently high, a high bit-error content can be due to strong interference I or pronounced multipath propagation. In order to reduce the bit-error content, the mobile MS1 can either shift to a new channel from the home base station BS1 or to a new base station, for instance the base station BS3 in FIG. 1. In this situation, an adequate choice can be made with the aid of the inventive C/I-value. If this value is high, the large bit-error content is most probably due to multipath propagation. A change of channel with the home base station BS1 will not change the propagation conditions of the signals and will likely not affect the bit-error content. A switch to a new base station is the best choice in this case. If, on the other hand, the C/I-value is low, the large bit-error content is most probably due to the fact that the interference I is strong, implying that a change of channel with the home base station BS1 is more than likely to be the best choice for reducing the bit-error content. In the case of a time-shared system, the interference I, and therewith the bit-error content, can be reduced by switching to a new time slot on the same carrier frequency.

I claim:

1. A method for determining a transmission quality of a home traffic connection in a mobile radio system, where the mobile radio system includes two-way radio channels, each channel having two carrier frequencies at a desired frequency distance from one another: the home traffic connection, which is established between a first base station and a first subscriber mobile station, utilizes a first radio channel; and wherein the first radio channel can be reused within the mobile radio system by a second base station and another subscriber mobile station as a traffic connection whose radio signals are liable to interfere with the radio signals of the home traffic connection at the first base station, comprising the following method steps:

measuring, at a first location, the combined received signal strength (C+I) of the carrier frequencies on the first radio channel during the transmission of speech or data;

measuring, at the first location, the signal strength of an interfering carrier frequency (I) on the first radio channel in a time interval during which the carrier frequency of the home traffic connection is closed down; and calculating the transmission quality as the quotient (C/I), where (C) is the signal strength of the carrier frequency of the home traffic connection and (I) is the signal strength of the interfering carrier frequency.

2. A method according to claim 1, wherein at least either the first base station or the first mobile station is equipped with means for interrupting the transmission of its carrier frequency during a silent interval in which no information is transmitted, characterized by measuring the signal strength (I) of the interfering carrier frequency in the first base station during the silent interval of the first mobile station.

3. A method according to claim 1, wherein the mobile radio system has time-shared radio channels divided into time slots, characterized by measuring the signal strength (I) of the interfering carrier frequency over a time period between the time slots of the home traffic connection.

4. A method according to claim 1, wherein the mobile radio system has time shared radio channels divided into time slots and at least either the first base station or the first mobile station is equipped with means for interrupting the transmission of its carrier frequency, characterized in that the first mobile station interrupts the transmissions of its carrier frequency during predetermined time slots of the home traffic connection and said first base station measures the signal strength (I) of the interfering carrier frequency during said predetermined time slots.

5. A method according to claim 1, wherein the mobile radio system has time-shared radio channels divided into time slots and wherein at least either the first base station or the first mobile station is equipped with means for interrupting the transmission of its carrier frequency, and wherein a signal sequence transmitted in a time slot has a reserved portion, the first base station or the first mobile station, whichever is the transmitting station, interrupts the transmission of its carrier frequency during the reserved portion of a time slot; and wherein a message concerning this interruption is exchanged in the reserved portion of an adjacent time slot.

6. A method according to claim 1, wherein at least either the first base station or the first mobile station is equipped with means for interrupting the transmission of its carrier frequency during a silent interval in which no information is transmitted, characterized by measuring the signal strength (I) of the interfering carrier frequency in the first mobile station during the silent interval of the first base station.

7. A method according to claim 1, wherein the mobile radio system has time shared radio channels divided into time slots and at least either the first base station or the first mobile station is equipped with means for interrupting the transmission of its carrier frequency, characterized in that the first base station interrupts the transmissions of its carrier frequency during predetermined time slots of the home traffic connection and said first mobile station measures the signal strength (I) of the interfering carrier frequency during said predetermined time slots.

8. A method according to claim 1 wherein the first mobile station is disposed at the first location.

9. A method according to claim 1 wherein the first base station is disposed at the first location.

* * * * *